United States Patent
Miller et al.

(10) Patent No.: US 6,623,428 B2
(45) Date of Patent: Sep. 23, 2003

(54) DIGITAL IMAGE SEQUENCE DISPLAY SYSTEM AND METHOD

(75) Inventors: Michael E. Miller, Rochester, NY (US); Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/976,123

(22) Filed: Oct. 11, 2001

(65) Prior Publication Data

US 2003/0073922 A1 Apr. 17, 2003

(51) Int. Cl.[7] .................................................. A61B 5/00
(52) U.S. Cl. ...................... 600/300; 600/595; 434/38; 434/44; 128/897; 128/898
(58) Field of Search ................................ 600/300, 595; 128/897–898; 434/8, 38–44

(56) References Cited

U.S. PATENT DOCUMENTS

| | | | |
|---|---|---|---|
| 5,781,165 A | * 7/1998 | Tabata | ............................ 345/8 |
| 5,829,446 A | 11/1998 | Tiffany | |
| 6,001,065 A | 12/1999 | DeVito | |
| 6,234,983 B1 | * 5/2001 | Storey et al. | ............... 600/595 |
| 6,443,913 B1 | * 9/2002 | Kania | .......................... 600/595 |
| 6,445,364 B2 | * 9/2002 | Zwern | ............................. 345/8 |
| 6,500,008 B1 | * 12/2002 | Ebersole et al. | ............. 434/226 |

FOREIGN PATENT DOCUMENTS

WO    WO 97/01245    1/1997

* cited by examiner

Primary Examiner—Robert L. Nasser
(74) Attorney, Agent, or Firm—Thomas H. Close (57) ABSTRACT

A system and method of generating an immersive digital image sequence capable of providing a perception of self-motion, includes the steps of: generating the digital image sequence; and adjusting the digital image sequence to control the perception of self-motion, whereby the degree of motion sickness induced in a viewer of the digital image sequence is controlled.

44 Claims, 11 Drawing Sheets

DIGITAL IMAGE SEQUENCE DISPLAY SYSTEM AND METHOD

FIELD OF THE INVENTION

The present invention relates to the processing and display of digital image sequences and, more particularly, to ameliorating motion sickness induced in viewers of the image sequences.

BACKGROUND OF THE INVENTION

In a visual display system that depicts a real world motion scene, many people may experience motion sickness, or more precisely, simulator sickness. Individuals experiencing slight levels of simulator sickness may experience some level of positive effects, such as excitement. However, beyond some threshold, the viewer may begin to experience a number of negative effects such as light-headedness, nausea, headache and other undesirable symptoms. It is well understood that providing conflicting or inconsistent psychological cues to a viewer induces this particular type of illness.

In the type of system relevant to the present invention, the display system may provide visual stimulation that provides the perception that a viewer is undergoing motion. However, the individual's vestibular and/or proprioceptive system may not provide similar stimulation. Instead these systems may indicate the viewer is stationary (or when watching imagery while in a moving vehicle, not consistent with the visual or vestibular system). When conflicting cues are provided to a viewer, the viewer may experience a particular class of simulator sickness. Different people have different susceptibility to this type of sickness and the probability that any individual will experience sickness is dependent upon their susceptibility to this type of sickness and the strength of the visual stimulus.

Individual sensitivity to motion sickness varies quite dramatically. Among the known variables which effect sensitivity to motion sickness are:

Age: younger individuals are generally more susceptible than older individuals

Sex: females are generally more susceptible than males

Race: individuals of Asian background are more susceptible than Europeans or Africans Expectations and Previous Experience: individuals who have experienced simulator sickness are more likely to experience it in the future.

The strength of the visual stimulus for producing motion sickness is influenced by a number of factors. First, vection (the visually induced perception of self-motion) almost never occurs for display systems that span only a small proportion of the users' visual field of view. However, vection is typically thought to be a necessary pre-cursor to this type of sickness. Therefore, the visual stimulus that induces simulator sickness will be stronger for images that are displayed to fill a large proportion of the users' visual field. Further the strength of the percept will be highly dependent on the region of the image that is undergoing motion. Second, the amount of optical flow (or edges representing motion) will influence the onset of this class of simulator sickness. Images with few edges or little detail are less likely to produce this class of simulator sickness than images with significant texture and numbers of edges. Third, since the vestibular system is most sensitive to changes in acceleration, images which depict changing acceleration are more likely to produce sickness than images depicting a constant velocity. Fourth, if an image sequence is captured in stereo with faithful stereoscopic cues, the system may elucidate stronger vection and be more likely to induce illness. Fifth, the depiction of other conflicting information is also likely to increase the probability of the onset of motion sickness. For example, if the image sequence information portrays the viewer navigating the world in a fixed-wing aircraft, then a portion of the image sequence indicating that the viewer is moving backwards is inconsistent with the users' frame of reference. Likewise, an automobile that rolls more than 45 degrees without rolling over may also be considered as providing information that is inconsistent with the users' frame of reference. In either of these situations and others that provide conflicting information, the viewer is more likely to experience illness.

There is a need therefore for an improved method of generating a digital image sequence that reduces the degree and incidence of motion sickness in viewers.

SUMMARY OF THE INVENTION

A method of generating an immersive digital image sequence capable of providing a perception of self-motion, includes the steps of generating the digital image sequence and adjusting the digital image sequence to control the perception of self-motion, such that the degree of motion sickness induced in a viewer of the digital image sequence is controlled.

ADVANTAGES

The present invention has the advantage that it reduces the degree and incidence of motion sickness in viewers of digital image sequences.

DETAILED DESCRIPTION OF THE INVENTION

The present invention provides a method and system for altering a digital image sequence that has been captured, pre-rendered, or that is being rendered in real-time in order to reduce the occurrence of motion sickness. This method and system may also utilize knowledge of the display and an analysis of the digital image sequence to determine the propensity of the displayed digital image sequence to produce motion sickness. This analysis is used to determine the portions of the digital video sequence to be altered. The present invention also considers viewer characteristics in order to determine when and to what degree the digital image sequence should be altered.

Figure 1:
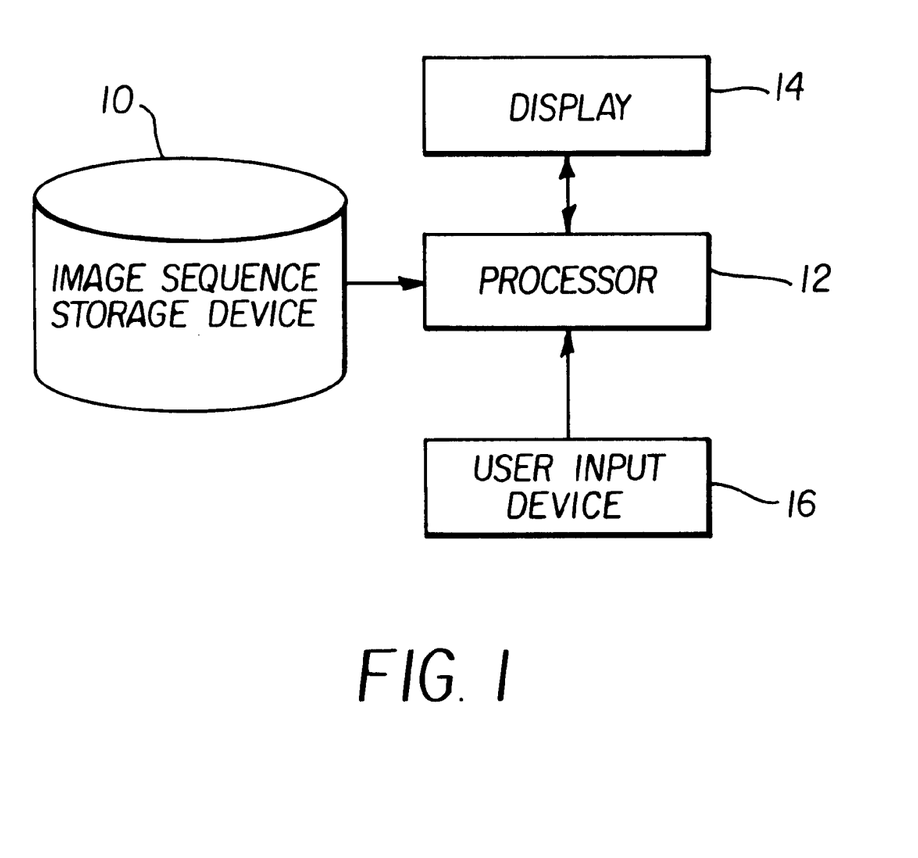
FIG. 1 is a block diagram of an imaging system useful for practicing the present invention.

One embodiment of a system useful for practicing the present invention is shown in FIG. 1. Referring to FIG. 1, the system contains a digital image sequence storage device 10, a digital image processor 12, a digital image sequence display system 14, and a viewer input device 16. The digital image sequence storage device 10 may be any electro-optical or -magnetic storage device, such as a hard drive, compact disk (CD) reader, digital video disk (DVD) reader, or network connection capable of delivering digital image sequence information. The digital image sequence storage device 10 contains multiple versions of a digital image sequence with different degrees of motion stimulation.

The processor 12 may be any general or specialized processor capable of supporting viewer interaction, selection of digital image sequence clips, and display of selected video sequence clips. The display 14 may be any digital image sequence display, including direct view and projection displays. The display 14 may be based on any known electronic display technology, including Organic Light Emitting Diode, Digital Micro-Mirror, Liquid Crystal, Cathode Ray Tube, or Ferro-Electric technology. However, the system preferably employs an immersive display system (i.e., a system that provides a large field of view to the user) such as might be applied in digital cinema or virtual reality systems which presents imagery to either a single person or a group of individuals. The viewer input device 16 that is used may be any input device including a keypad, keyboard, mouse, slider bar, data glove, joystick or any other device that allows the viewer to select among a few discrete options.

Figure 2:
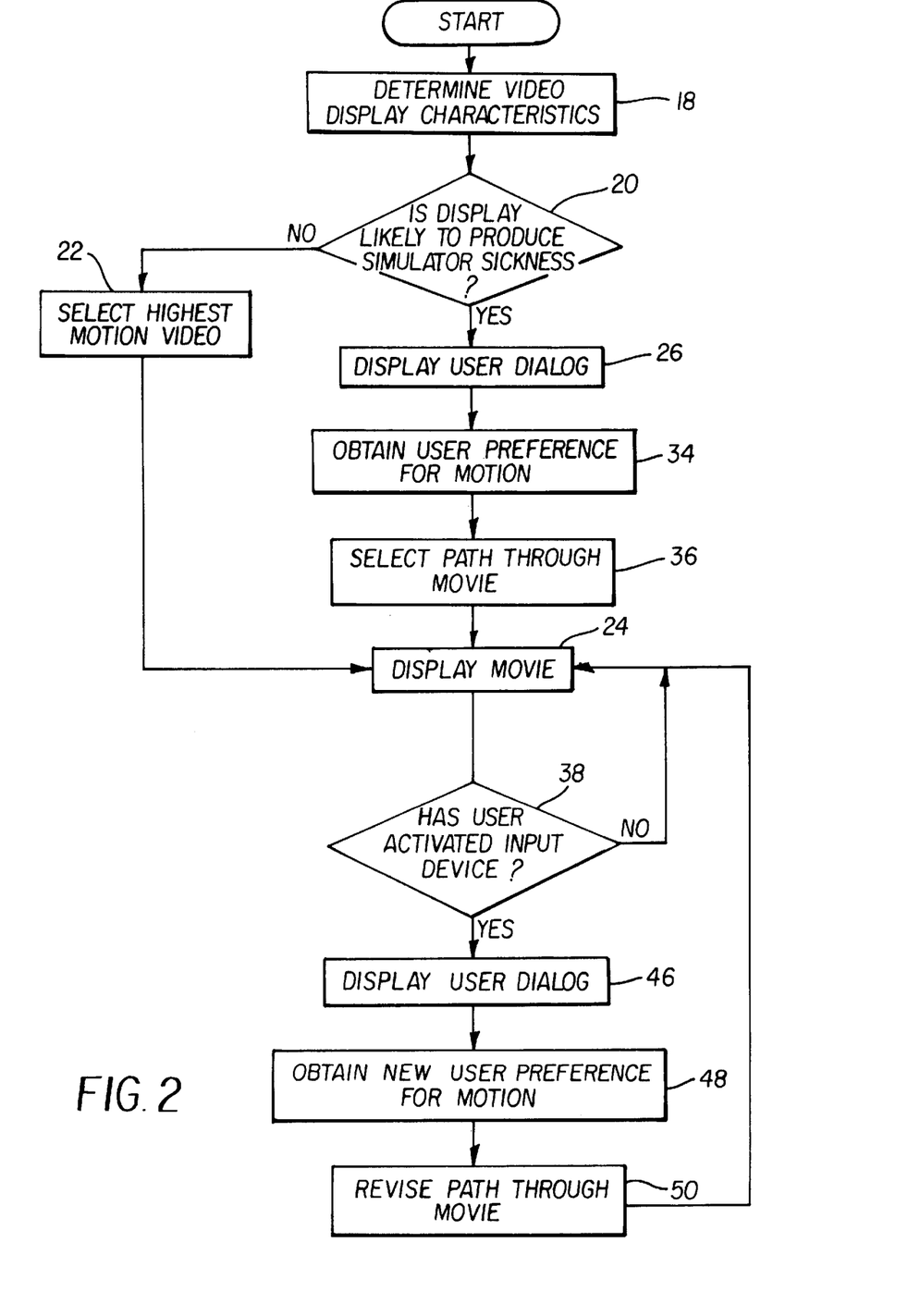
FIG. 2 is a detailed flow diagram illustrating the viewer interaction process used in one embodiment of the present invention.
Figure 3:
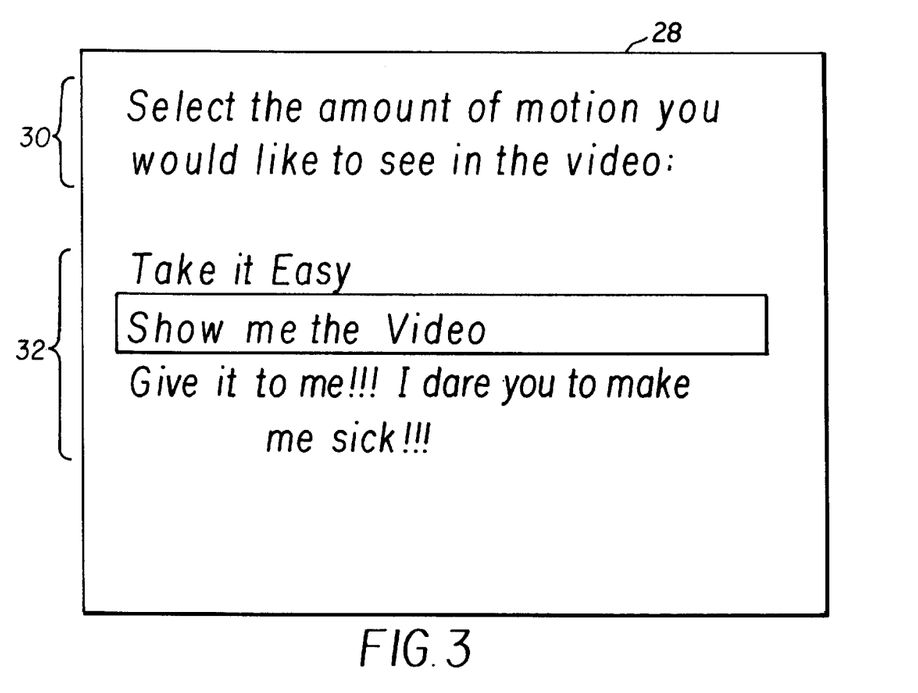
FIG. 3 is an illustration of a viewer interface message used with the present invention.

FIG. 2 shows a flow chart of the operation of the system according to the present invention. Referring to FIG. 2, using information about the display system, the system receives 18 the display characteristics and determines 20 whether any users are likely to experience simulator sickness. If motion sickness is unlikely, the highest vection path through the image sequence is selected 22. The image sequence is then displayed 24 to the viewer(s). If the field of the view of the display is large enough to provoke motion sickness, the viewer is provided 26 the ability to select the amount of stimulation he or she desires using an interactive display screen and input device. This interactive screen may provide options similar to those shown in FIG. 3. Referring to FIG. 3, a screen 28 displays instructional text 30 and a list of potential selections 32. Once the viewer makes a selection 34 a particular path in a multiple path image sequence is selected 36 utilizing knowledge of the display system such that the path provides the viewer with an amount of motion stimulation commensurate with his or her selection. The sequence is then composed from the chosen clips and displayed 24. As long as the viewer does not initiate an action with his or her input device, the sequence continues to play.

Figure 4:
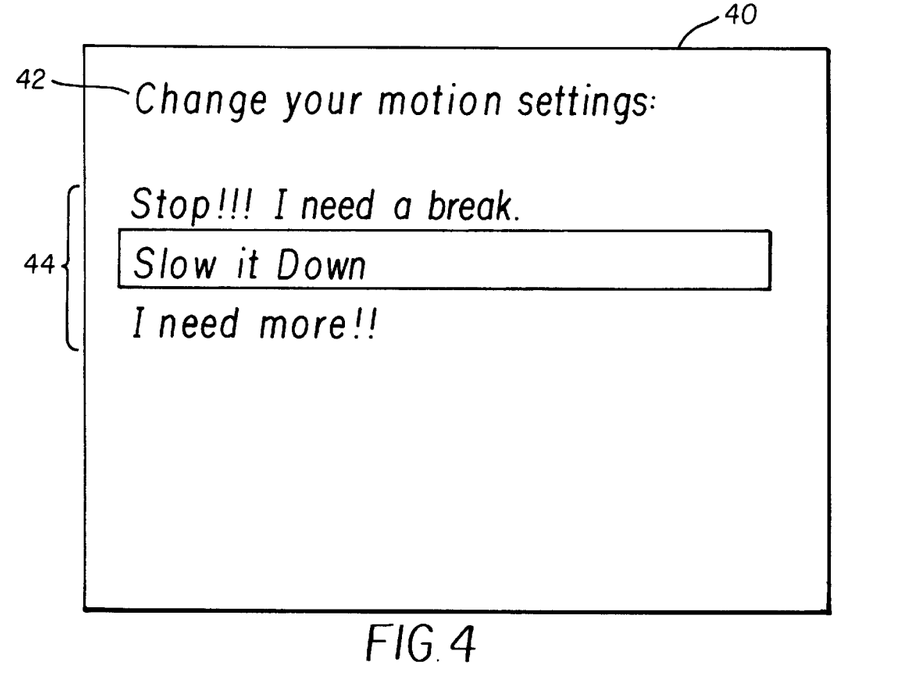
FIG. 4 is another illustration of a viewer interface message used with the present invention.

The sequence may reach the end with no viewer input. However, if during the sequence the viewer begins to experience any degree of discomfort or boredom, he or she may use 38 the input device to display 46 another interactive screen 40 such as the one shown in FIG. 4 and to reduce or increase the amount of self motion stimulation. Referring to FIG. 4, the screen 40 displays instructional text 42 and a list of potential selections 44. Once another selection is made, the system obtains 48 this preference and a new path in the multi-path sequence is selected 50 to provide the appropriate level of motion stimulation. The new path through the sequence is then composed and the display 24 of the sequence is resumed with the newly selected path.

Figure 5:
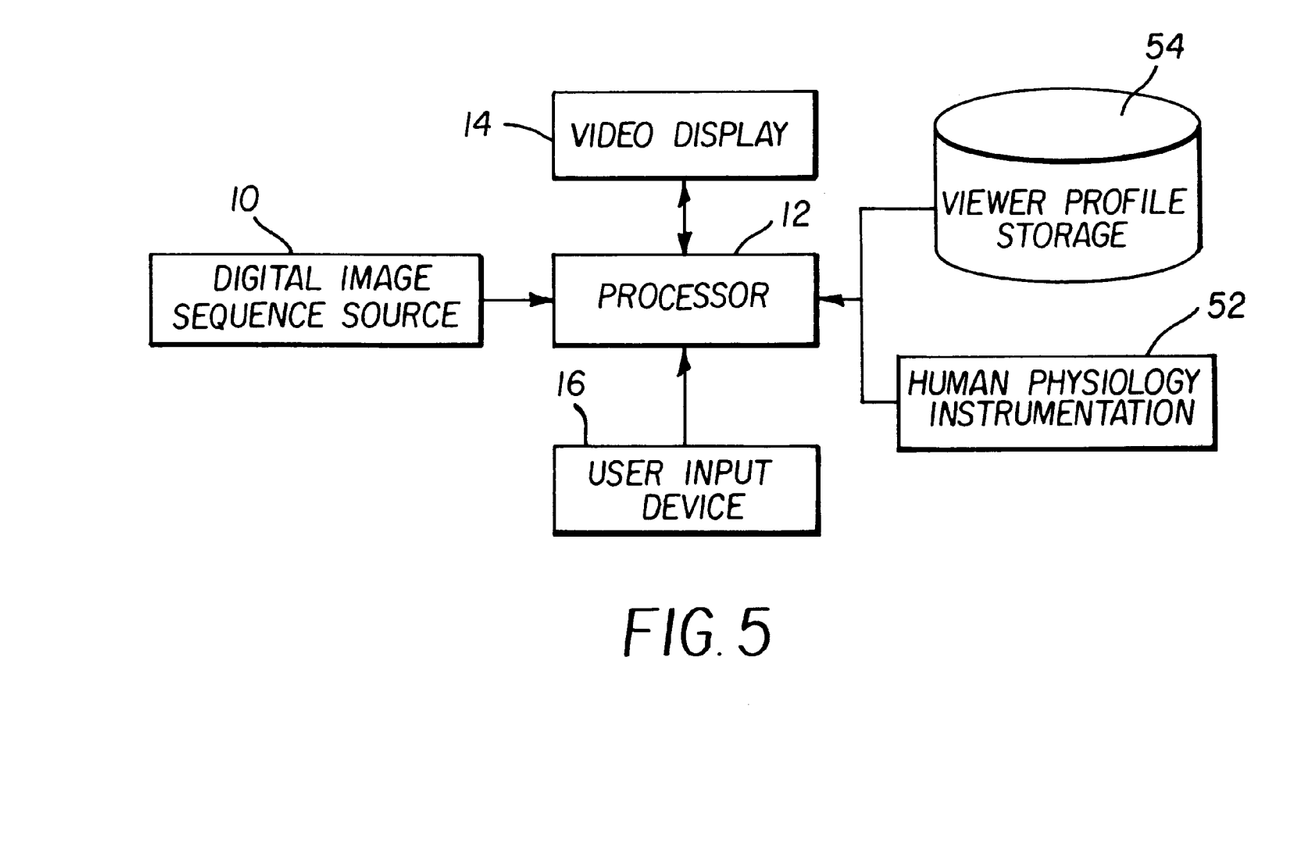
FIG. 5 is a block diagram illustrating an alternative embodiment of the present invention.

Referring to FIG. 5, in an alternative embodiment of the present invention the system additionally includes one or more sensors 52 for sensing, recording, and analyzing a human physiological response and a source 54 containing a viewer profile and history data.

The source 54 for viewer profile or history data may be any networked computer database or a portable data device, such as a magnetic card, that may be transported with the viewer.

The physiological-response measuring device 52 may be any device capable of sensing increases in sympathetic nervous system activity and/or decreases in parasympathetic nervous system activity. Such devices 52 may include instruments capable of measuring the pallor (de-saturation due to loss of blood flow) of extremities (particularly hands and face), heart rate variability, galvanic skin response, eye movements, drowsiness (eyes closed), breathing rate and volume, temperature of extremities and regularity of gastrointestinal muscle activity.

Figures 6, 6A:
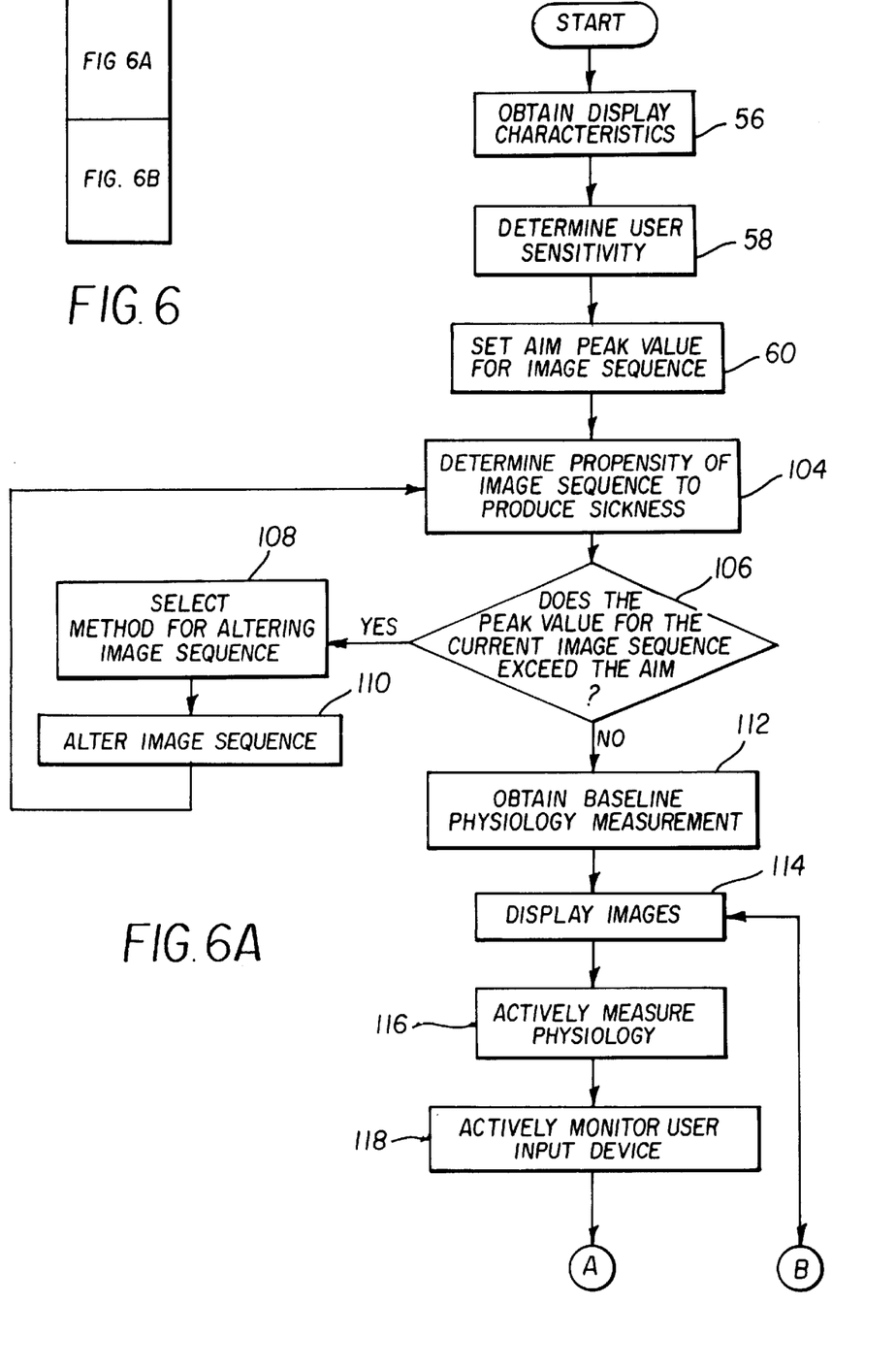
FIG. 6 is a flow diagram illustrating a method for image analysis used in the present invention.
Figure 6B:
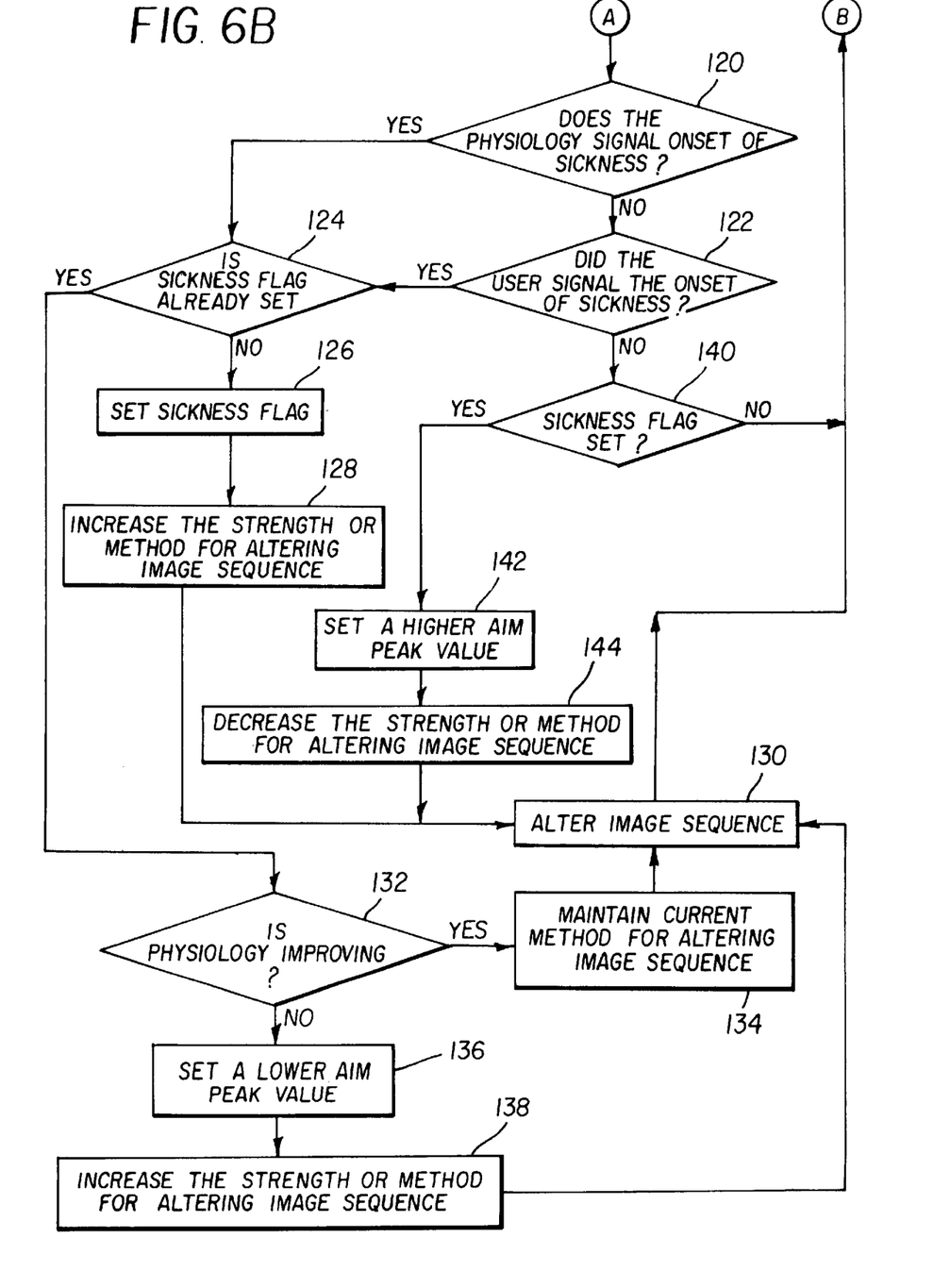

Referring to FIG. 6, a high-level flow chart of the actions performed by the system of FIG. 5 is shown. First information about the display device to be used is retrieved 56. A viewer swipes a magnetic card through a reader before entering the display system. This identifies the viewer and recalls historical information from an on-line database. The system then evaluates the viewer's history to determine 58 the viewer's propensity towards motion sickness. This historical information may include information regarding the users' gender, race, or medical information that may provide some information on how likely the viewer is to experience sickness. The historical data may also contain information on previous experiences including the peak value in the simulator sickness propensity measure calculated in the previous step for all previously viewed experiences, and a list of these experiences where the viewer indicated some sensation of simulator sickness.

Based on this historical data, an aim peak value will be set 60 for the simulator sickness propensity measure. If the viewer has indicated the sensation of simulator sickness in recent experiences, this value will be set to a value smaller than the peak value obtained during that experience. If however, the viewer has not experienced this sensation recently and there is a long-term history demonstrating a peak value above which the viewer often experiences sickness then the system will adopt this peak value. If the viewer has not indicated sickness recently and there is no long-term history available, then the aim peak value will be set to a value higher than the average peak value obtained during their three most recent experiences.

The system then obtains information 104 regarding the propensity of the digital image sequence stream to induce simulator sickness. This propensity must be understood for individual digital image sequence clips within the digital image sequence stream or as a time series signal that accompanies the digital image sequence information. This signal may accompany the digital image sequence information and be stored with the digital image sequence, a storage device, or the digital image sequence information may be processed to determine this signal.

Figures 7, 7A:
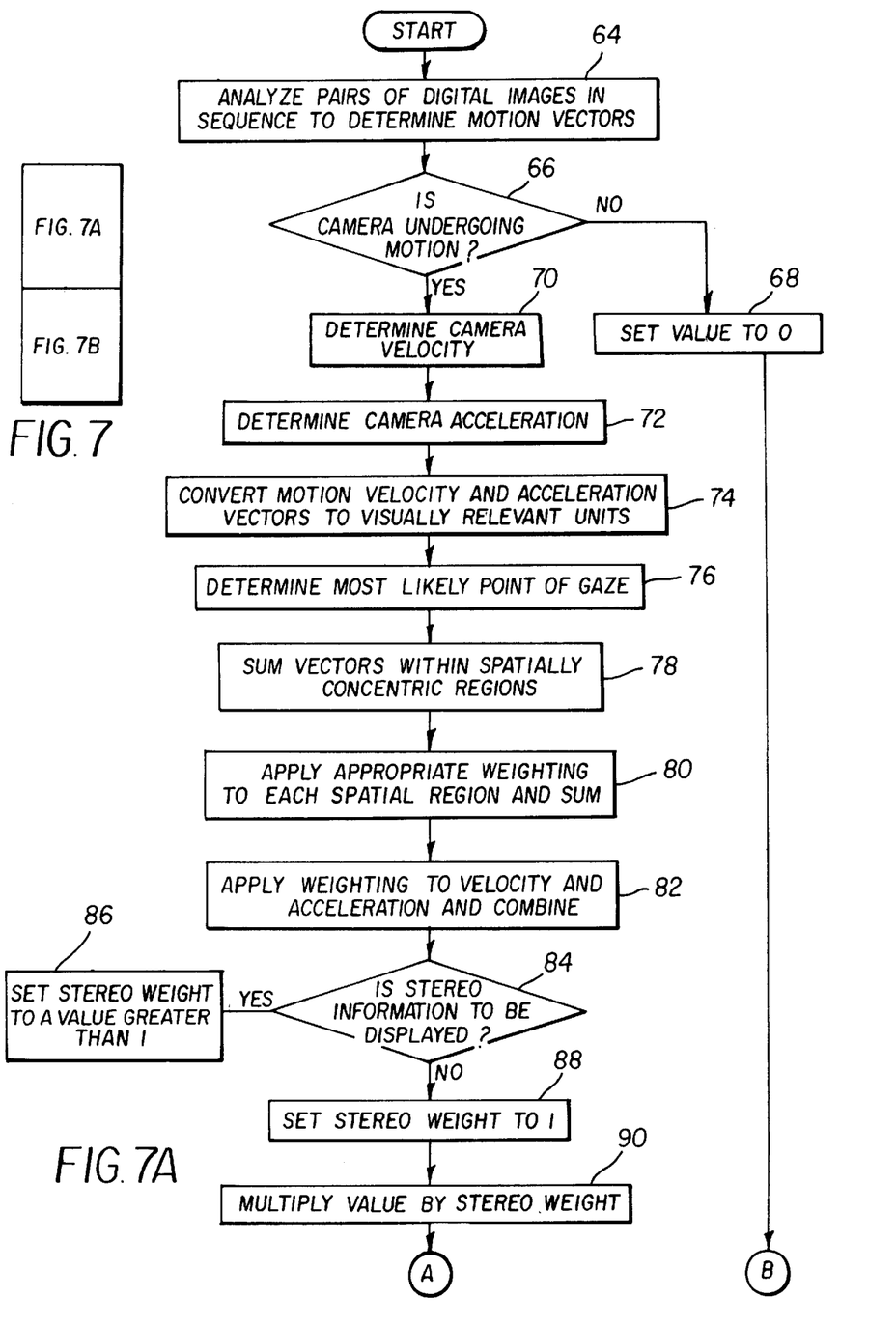
FIG. 7 is a detailed flow diagram illustrating the editor interaction process used in a third embodiment of the present invention.
Figure 7B:
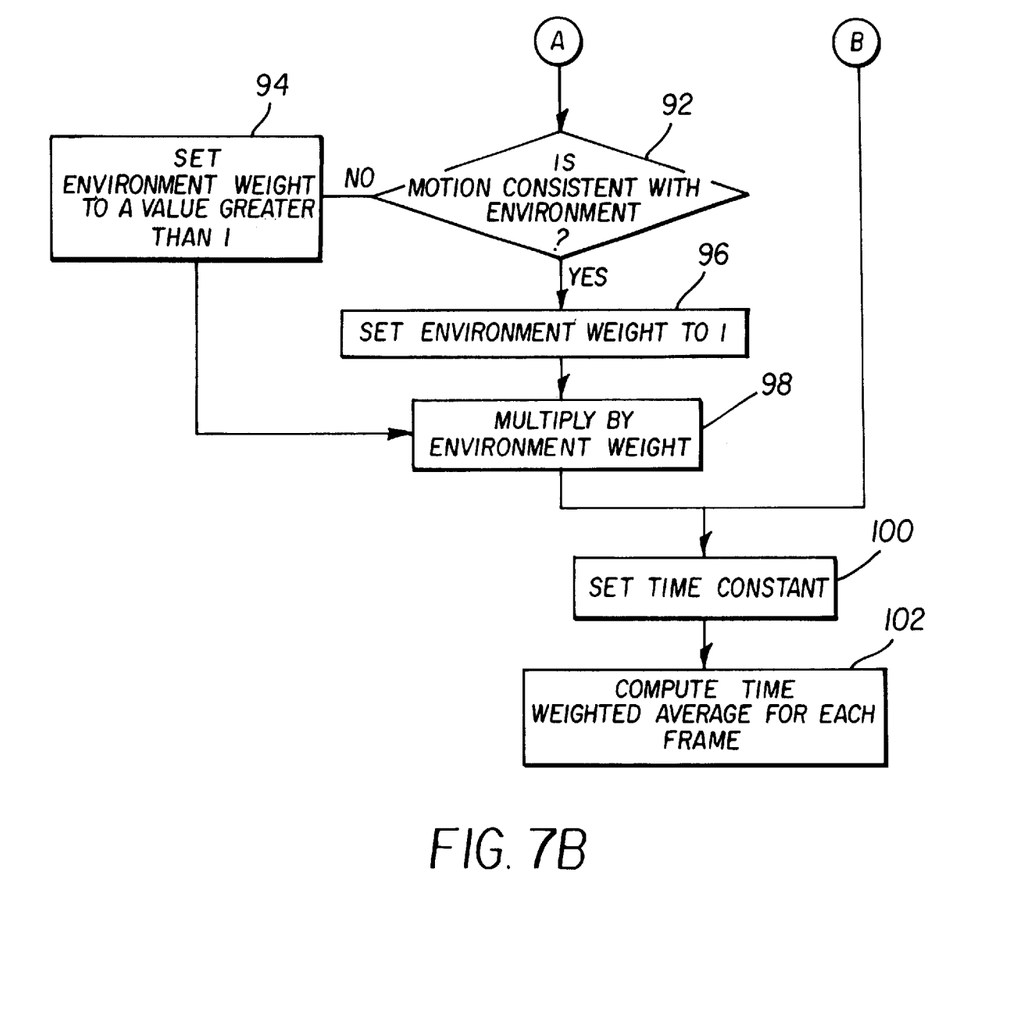

FIG. 7 shows a method that may be used to calculate a time-varying measure that will correlate to the likelihood that the digital image sequence information will induce simulator sickness. Referring to FIG. 7, sequences of image frames that were recorded in a time sequence are analyzed 64 to determine motion vectors between each pair of frames. The actual method used to compute the motion can vary. For example, high-speed block-based motion methods or optical-flow-based algorithms can provide dense motion vectors. Alternatively, feature-tracking methods may be used to provide a sparse yet accurate set of motion vectors through a sequence of images. These motion vectors are then analyzed to determine if they are consistent with camera movement within a 3D space.

The estimation of camera motion from image sequences is known as ego-motion estimation and there are several well-known algorithms for estimating this. A test 66 is performed to determine if ego motion is present. If the motion vectors between any two frames are not consistent with camera movement then the time lapse between these two images is classified as being non-provocative and the instantaneous value is set to 0 68. If the motion vectors between the two frames are consistent with camera movement through a 3D space, the motion vectors are further analyzed to determine 70 the speed and direction of motion, and determine camera acceleration 72. The speed and direction of motion may then be further analyzed (not shown) to determine if the direction of motion is consistent with the environment in which the viewer is being depicted.

An instantaneous indication of the propensity of the digital image sequence to provoke simulator sickness may then be calculated based upon the information determined from analyzing the sequence of digital image sequence frames. To perform the calculation, the final resolution and field of view for the display is used to transform 74 the edge motion vectors to visually relevant units, such as degrees of visual arc per second. The most likely point of gaze of the user is then determined 76 by finding the most stable point in the image. The edge motion vector lengths are then summed 78 within each of a number of spatial zones at different distances from the center of the image. A weighted average is then computed 80 from these sums such that an edge undergoing motion far from the center of the display is likely to have a larger impact than this same edge when it is presented in the center of the display. A weighting may then be applied 82 to this value by multiplying by a value of 1 plus a constant, times absolute value of the acceleration in visually relevant units, such as degrees of visual arc per square second. A determination 84 is made as to whether stereo information is being displayed. If stereo information is being displayed, a weighting constant greater than 1 is set 86. If stereo is not being displayed, the weighting factor is set 88 to 1. The value can then be multiplied 90 by the weighting constant. A test is performed 92 to determine if the velocity and acceleration of the imagery is consistent with the depicted environment. If not, an environment weight is set 94 to a value greater than 1. If so, then the environment weight is set 96 to 1. The value is then multiplied 98 by the environment weight.

Because the onset of motion sickness is not instantaneous but builds up over time, a time constant is set 100 and a time-weighted average of the values is computed 102. In the alternative embodiment in which the image sequence is generated rather than stored and re-played, the same characteristics as those described can be analyzed to measure the sequence's predilection to induce motion sickness. Preferably, the information relevant to the desired level of motion sickness inducing imagery can be used to create an appropriate sequence in the first place. In this embodiment, no analysis of the sequence specification is necessary. Rather, the sequence is constructed with specific constraints reducing the likelihood of inducing motion sickness in a viewer. If modification of the sequence is necessary in response to viewer action, the appropriate modified constraints can be applied in real-time to create an alternative sequence with reduced predilection to induce motion sickness.

Referring again to FIG. 6, once the propensity measure is calculated 104 for the image sequence or specification, this time varying value is then compared to the aim peak value to determine 106 if the digital image sequence will provide a propensity value that is higher than the peak value for the individual. If the digital image sequence does provide a sickness propensity value higher than the aim peak value, the imagery is processed to reduce the peak value of the digital image sequence. The digital image sequence stream or specification may be processed in any number of ways to reduce this value. Among the approaches that might be applied are:

alter the velocity of motion and acceleration in the digital imagery by interpolating frames in the digital image sequence, effectively reducing the perceived velocity and acceleration within the digital image sequence;

apply spatial filtering or contrast reduction to the imagery to reduce the number and the contrast of edges in the digital image sequence, especially near the edges of the display or away from the main subject matter that would normally be presented at the edge of the display;

presenting a uniform area in the peripheral portions of the digital video signal, effectively reducing the field of view of the display system, select a digital image sequence clip with similar content but less provocative motion;

skip particularly provocative portions of the digital image sequence;

remove the stereo information from the scenery, if the digital image sequence is available in stereo, copying the information that would be presented in one stereo channel to both stereo channels;

add conflicting or distracting information to the image, such as image noise, which may detract from the perception of vection or reduce the perceived speed of motion;

add a fixed frame of reference to the imagery, such as a stable horizon line or aircraft airframe on which the viewer can fixate to reduce the perception of self motion;

if the imagery is generated, the maximum camera velocity and acceleration may be limited;

if the imagery is generated in an interactive system, the ratio between viewer input to a viewer input device and changes to the system behavior will be reduced (e.g., the ratio of the displacement of a steering wheel to radius of turn will be reduced or the ratio of the displacement of an accelerator to the change in velocity may be decreased).

Depending upon the amount of reduction required in the sickness propensity value, any one or a combination of these techniques may be selected 108 and applied 110 to reduce the stimulus for motion sickness in the scene.

It may be observed by one skilled in the art that many of the spatial image manipulations discussed above may require a substantial number of processing cycles to complete in real time. A particularly attractive embodiment of this invention therefore, performs the spatial filtering operation(s) noted above by decreasing the image fidelity of a JPEG, JPEG 2000, or MPEG compressed image. This manipulation is performed by disregarding certain high-frequency bands that could be decompressed and displayed within these or any other hierarchical image compression format. This operation may be performed in a spatially uniform or spatially non-uniform fashion.

A base-line reading of viewer physiology is then captured 112 by measuring human physiology such as the participants' galvanic skin response and the color of the skin on the back of the hand or the forehead. When the digital image sequence information is available, it is then displayed 114 to the viewer. As the digital image sequence is displayed 114, the galvanic skin response and pallor of the viewer is measured 116 before and during each scene that is indicated as being provocative based on the analysis of the motion vectors. Additionally, the viewer input device is monitored 118 to determine if the viewer is signaling a desire to change the amount of motion stimulus. If a significant change in physiology (e.g., GSR and/or pallor) is measured 120 during a motion clip or if the viewer signals 122 a desire to change the amount of motion stimulus, the system determines 124 if a flag to indicate that onset of sickness has already been set. If not, the flag is set 126, a more aggressive means of altering the image sequence is chosen 128 and the image sequence is altered 130 further before displaying 114 it to the viewer. If the flag is already set, the system determines 132 if the physiology is improving. If it is, then the current method of filtering is improving the symptoms and the method for processing the image sequence remains unaltered 134. However, if the physiology is not improving, a lower aim peak value for the simulator sickness propensity value is calculated 136. A more aggressive method for processing the image sequence is then selected 138 and all future digital image sequence clips with values higher than the aim propensity value are altered 130 to further reduce the propensity for sickness.

Returning to step 122, if the viewer does not signal the onset of sickness, the sickness flag is checked 140, and if it is set, a higher aim peak value is set 142. A less aggressive method for processing the image sequence is selected 144. The image is then processed 130 and displayed 114. If on the other hand, the sickness flag is not set, the image display is continued.

Figure 8:
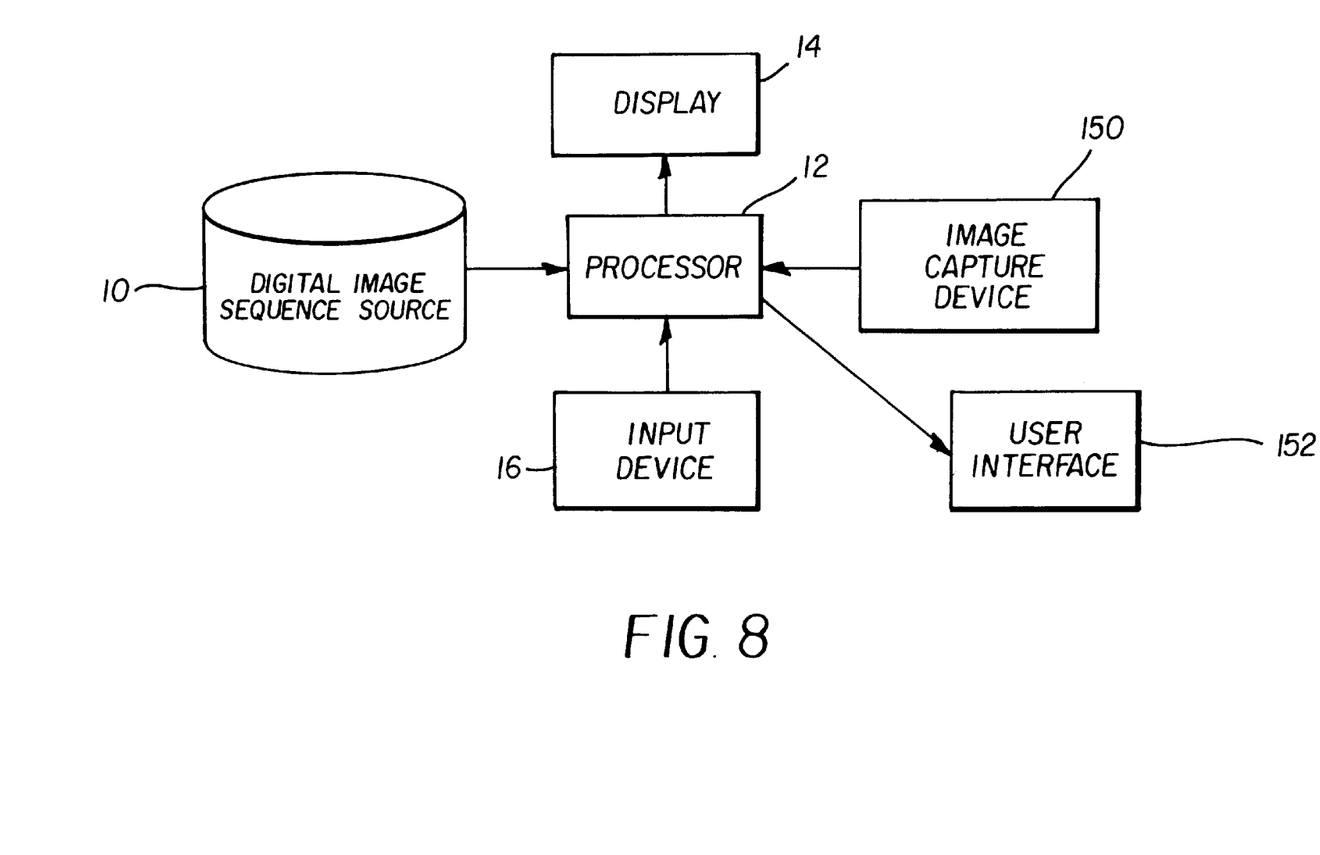
FIG. 8 is a block diagram illustrating a third embodiment of the present invention.

An alternative embodiment of the present invention is shown in FIG. 8 which includes a user interface 152, and a video capture device 150, such as an electronic video camera or a film scanner, or a video generation device.

The user interface 152 can be any text or image display capable of displaying a number that provides an indication of the likelihood that the video clip will induce motion sickness within a targeted video clip. The user interface 152 may be incorporated in the image display 14 that allows the viewer to view the image sequence and to provide the system feedback on its editing process.

Figure 9:
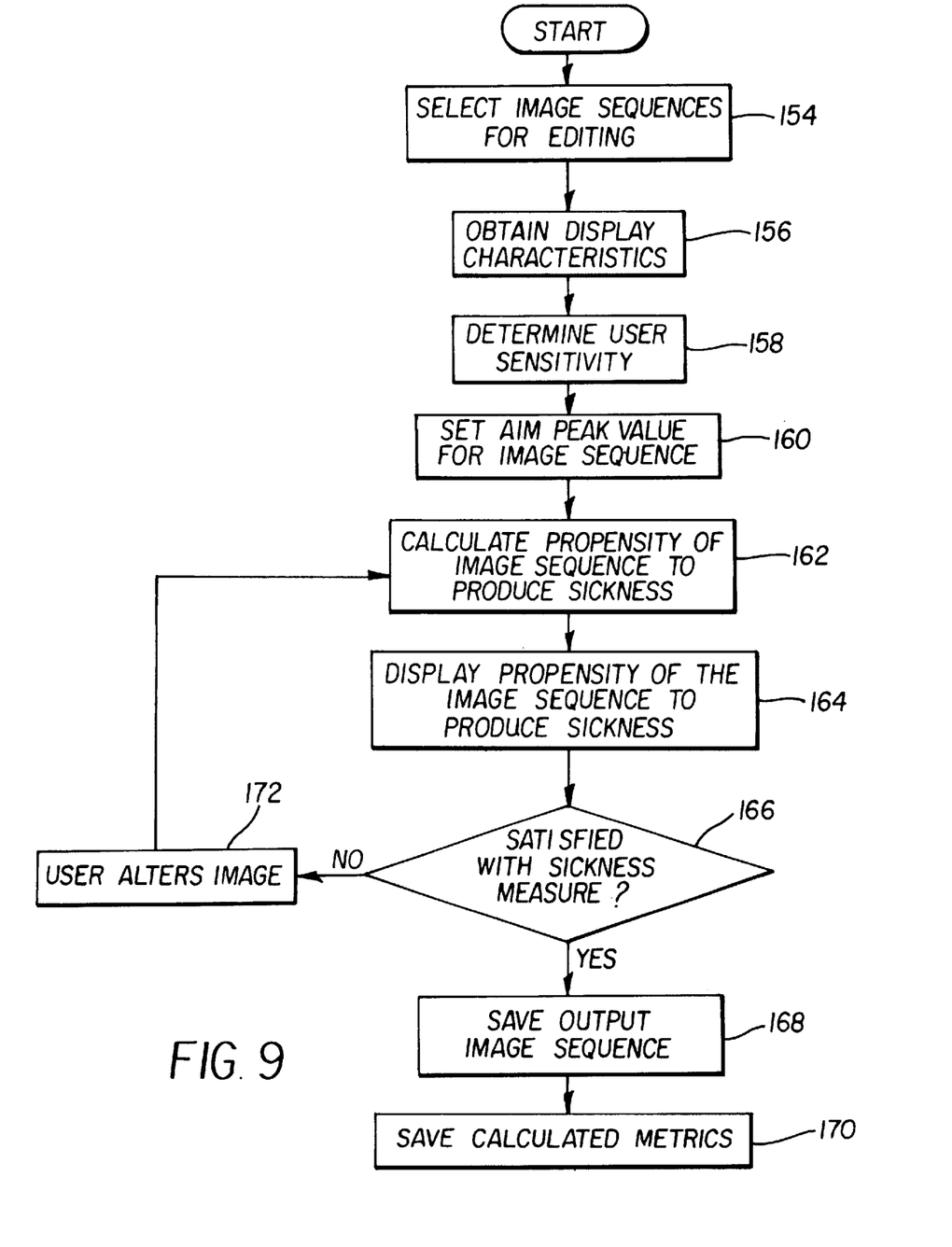
FIG. 9 is viewer a flow diagram of the steps of using the system of FIG. 8.

FIG. 9 shows a flow chart of the actions performed by the system shown in FIG. 8. Referring to FIG. 9, the viewer selects 154 an image sequence for editing. Next, the viewer indicates 156 the display characteristics. The viewer then indicates the user population which is used to determine 158 user sensitivity to simulator sickness. Using this value, the system sets 160 an aim peak value representing the propensity of the system to cause simulator sickness. The propensity of the image sequence to cause sickness is then calculated 162. This value is displayed 164 to the viewer. If the viewer is comfortable with this value the viewer may decide 166 to save the image sequence without further modification. The system then saves the calculated values 170 and images 168 to an output file. If the user is not comfortable with the value, the user can apply 172 image processing to reduce the propensity of the image sequence to produce motion sickness. The propensity of image sequence to produce motion sickness is again calculated 162 and the process repeats.

Figure 10:
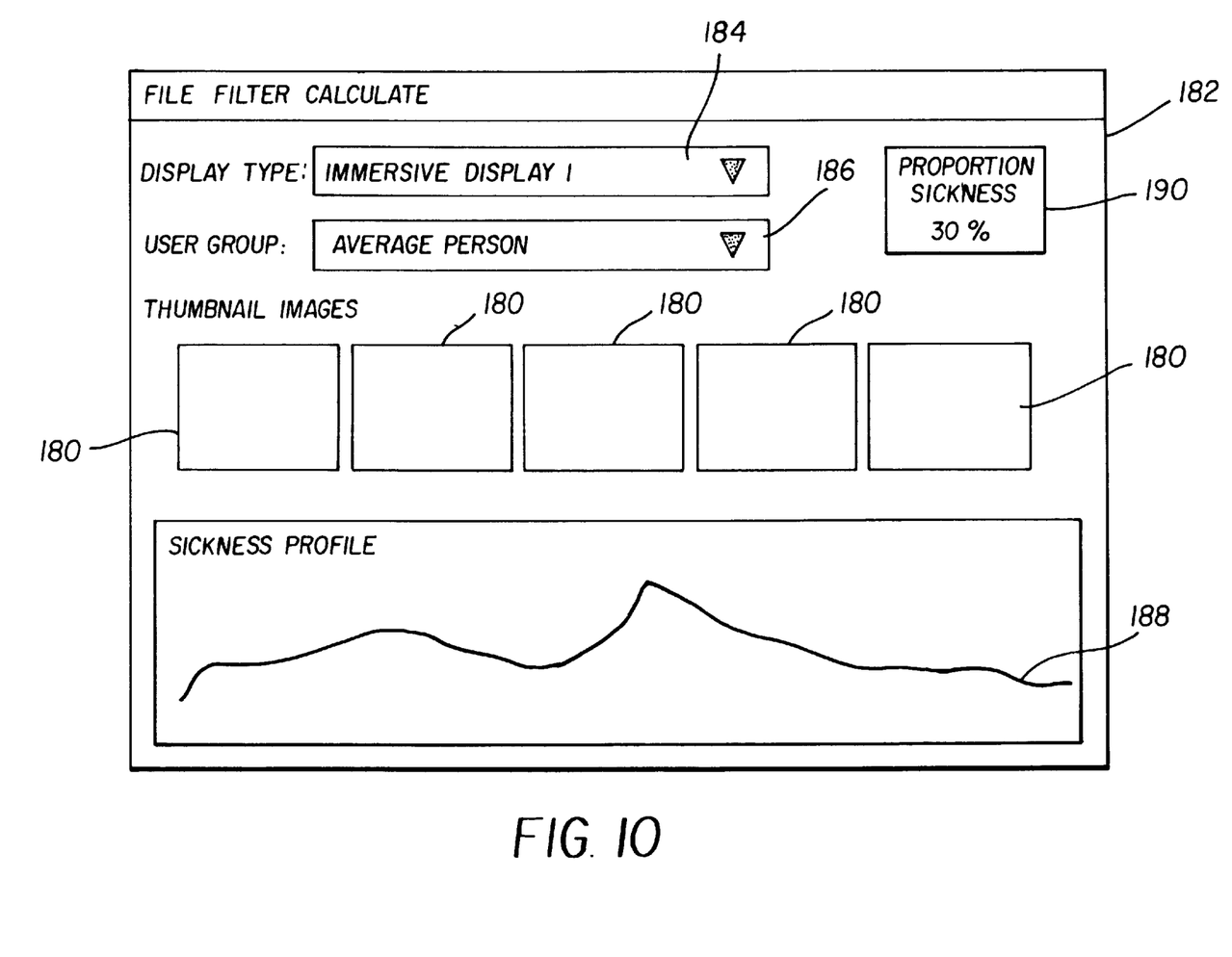
FIG. 10 is an illustration of a viewer interface screen that allows the viewer to modify the characteristics of the target display system.

Once the viewer selects an image sequence for analysis, the viewer interface screen 156 such as the one shown in FIG. 10 can then be displayed. This display screen allows the viewer to see a series of thumbnails 180 that indicate different clips of video within the image sequence. The viewer interface screen 182 also shows a current selection 184 for the final display on which the digital image sequence will be viewed. The viewer may activate this menu to select another display system or to change the characteristics of the target display. The viewer selects the display characteristics, selects a viewer group to indicate viewer sensitivity and set an aim peak value for a sickness propensity value. By changing this selection, the viewer can modify relevant display characteristics such as the horizontal and vertical size of the display, the viewing distance to the screen, and whether the display is a stereoscopic display screen or not.

The viewer interface also provides a display 186 of the current viewer population selected. The viewer may then modify the viewer population for which the video image sequence is being designed. As an example, the viewer may select a viewer population such as European males or Asian females. Based on data collected about individuals in these populations, the proportion of people in this population likely to experience motion sickness is estimated as a function of the maximum propensity of the digital image sequence to induce sickness on the selected display. This value is obtained by performing a look up of the maximum of the time-weighted average of the digital image sequence propensity value to determine subjective data collected in previously conducted experiments with groups from these populations. Based on this lookup, a value indicating the proportion of individuals who are likely to experience sickness may be generated and reported to the viewer of the software.

A measure of the propensity of the digital image sequence to induce sickness or the proportion of individuals in the selected population who are likely to experience sickness is then calculated. A method for calculating the propensity of the image sequence to produce motion sickness has already been discussed and is shown in FIG. 7.

This value is then displayed. The value may be presented to the viewer in a number of ways. One potential display of this information is shown as a sickness profile 188 in the example viewer interface depicted in FIG. 10. As already discussed, the interface shown in FIG. 10, may include a view of key image frames in the image sequence. The sickness profile is a time varying trace 188 of the propensity of the video to produce motion sickness. The display may also include an overall estimate 190 of the proportion of people who are likely to experience sickness.

If the viewer decides that the stimulus for motion sickness is inappropriate after viewing the video and/or viewing the sickness propensity measure or the estimate of the proportion of individuals likely to experience negative symptoms, they may alter the current motion clip or produce a more desirable motion sequence.

Many editing tools may be provided to the viewer of this system. These tools may include one or all of the following:

a tool to alter the rate of motion and acceleration in the video by interpolating or integrating frames in the video, effectively reducing or increasing the perceived speed of action within the video;

a tool to apply spatial filtering or contrast changes to the imagery to reduce or increase the number and the contrast of edges in the image sequences, especially near the edges of the display;

a tool to indicate the region of focus within the video, and then apply spatial filtering or contrast changes away from this region of focus to reduce or increase the number and the contrast of edges in the video;

a tool for replacing peripheral portions of the video with a uniform area, effectively reducing the field of view of the display system;

a tool to allow the viewer to re-order scenes that have a high stimulus for motion sickness, interspersing these frames with still frames to reduce the onset of motion sickness;

a tool to select another motion clip with a different level of stimulus for motion sickness in place of the current clip;

a tool to remove portions of particularly provocative scenes, reducing the time duration of provocative scenes such that the likelihood of the onset of motion sickness is reduced;

a tool to remove the stereo information from the scenery, copying the information that would be presented in one stereo channel to both stereo channels;

a tool for adding noise or another distracting stimulus to the video information in order to reduce the perceived contrast of edges in the scene and reduce the perceived speed of motion of the video;

a tool for adding a fixed frame of reference to the imagery, such as a stable horizon line or aircraft airframe on which the viewer can fixate to reduce the perception of self motion;

if the imagery is generated, the maximum camera velocity and acceleration may be limited.

As these edits are made to the video sequence, the estimate of motion sickness may be updated to reflect these changes. The viewer may interact with this system to produce one or more videos with different propensities to produce the onset of motion sickness.

Once the viewer has completed editing the video, the system then allows the director to output the resulting data. The system may also allow the viewer to output values that were calculated by the system. These may include the raw motion vector data, the velocity information, the acceleration information, and/or the propensity for motion sickness profile data in a format that accompanies the video information. This information may then be further utilized by a display system, such as either of the systems disclosed earlier.

While the system described here is a motion image editing system, one skilled in the state of the art will realize that this system could be embedded into an advanced digital video capture device, such as a digital video camera. In such a configuration, a videographer could capture a scene, review the scene and the data provided on the likelihood of the system to produce simulator sickness and then immediately decide to capture the scene again in a way that would alter the likelihood of the onset of motion sickness.

The invention has been described in detail with particular reference to certain preferred embodiments thereof, but it will be understood that variations and modifications can be effected within the spirit and scope of the invention.

PARTS LIST 10 storage device
12 digital image processor
14 image sequence display system
16 viewer input device
18 receive characteristics step
20 determine likelihood of sickness step
22 select highest vection path step
24 display image sequence step
26 provide viewer selection step
28 screen
30 text
32 list of selections
34 viewer selection step
36 select sequence step
38 use input device step
40 screen
42 text
44 list of selection
46 display step
48 obtain preference step
50 select sequence step
52 physiological response sensor
54 viewer profile source
56 retrieve information step
58 determine viewer propensity towards motion sickness
60 set peak value step
64 analyze time sequence step
66 perform test step
68 set value to zero step
70 determine speed step
72 determine camera acceleration step
74 transform edge motion vector step
76 determine point of gaze step
78 sum motion vector lengths step
80 compute average step
82 apply weighting step
84 determine stereo step
86 set weighting constant to greater than one step
88 set weighting constant to one step
90 multiply by weighting factor step
92 perform test step
94 set environment weight to greater than one step
96 set environment weight to one step
98 multiply step
100 set time constant step
102 computer weighted average time constant step
104 calculate propensity measure step
106 determine if propensity is higher than peak value step
108 select technique step
110 apply technique step
112 capture viewer base-line physiology step
114 display information step
116 measure viewer pallor
118 monitor viewer input device
120 measure change in physiology step
122 viewer signals step
124 determine if flag is set step
126 set flag step
128 chose alteration step
130 alter sequence step
132 determine physiology is improving step
134 do not alter method step
136 lower aim value step 138 select more aggressive method step
140 check flag step
142 set higher aim value step
144 select less aggressive method step
150 video capture device
152 user interface
154 select image sequence step
156 indicate display characteristics step
158 determine user sensitivity step
160 set aim peak step
162 calculate propensity to cause sickness step
164 display value step
166 decide to save step
168 save images step
170 save calculated values step
172 apply image processing step
180 thumbnails
182 viewer interface screen
184 current selection
186 current viewer population display
188 sickness profile
190 estimate of the proportion of people likely to get sick

What is claimed is:

1. A method of generating an immersive digital image sequence capable of providing a perception of self-motion, comprising the steps of:
  a) generating the digital image sequence; and
  b) adjusting the digital image sequence in response to a viewer selection to control the perception of self-motion such that the degree of motion sickness induced in a viewer of the digital image sequence is controlled.

2. The method claimed in claim 1, wherein the digital image sequence is adjusted by adjusting the images in the digital image sequence, with an adjustment selected from the group comprising: selectively controlling the sharpness of the entire image, selectively controlling the sharpness of the periphery of the image, selectively controlling the field of view of the image; selectively controlling the contrast of the displayed image; selectively controlling whether or not the image sequence is stereo or monoscopic; selectively controlling the apparent velocity or acceleration of the viewer of the image; selectively controlling the apparent orientation of the viewer with respect to the viewer's frame of reference; selectively controlling the angular rotation of the viewer's frame of reference; selectively controlling the noise in the periphery of the image; selectively interposing a fixed reference with respect to the image; selecting a sequence from a plurality of sequences having different amounts of self motion; and selectively controlling the control display ratio of a viewer interface device.

3. The method claimed in claim 2, wherein the digital image sequence is stored in a hierarchical compressed format, and the image sharpness is selectively controlled by decompressing a limited number of hierarchies.

4. The method claimed in claim 1, wherein the adjusting is performed in response to monitoring a viewer's physical response to viewing the image sequence.

5. The method claimed in claim 4, wherein the monitoring is selected from one or more of the group comprising: galvanic skin response, skin temperature, rate of perspiration, skin color, heart rate variability, frequency of eye movements, breathing rate, depth of breathing, and gastro-intestinal activity.

6. The method claimed in claim 1, wherein the viewer selection is performed while viewing the image sequence.

7. The method claimed in claim 1, wherein the viewer selection is performed prior to viewing the image sequence.

8. The method claimed claim 1, wherein the adjusting is performed by a creator of the digital image sequence to create a predetermined perception of self motion.

9. The method claimed in claim 1, wherein the digital image sequence is a computer-generated image sequence.

10. The method claimed in claim 1, wherein the digital image sequence is a photographic image sequence.

11. The method claimed in claim 10, wherein the adjusting step further comprises the steps of:
  b1) employing camera position information and edge information in a digital image sequence to determine the likelihood of motion sickness from the image sequence, and
  b2) adjusting the digital image sequence as a function of the determined likelihood of motion sickness.

12. The method claimed in claim 11, wherein one or more characteristics selected from the group comprising: edge velocity and acceleration in the image sequence, display characteristics, a measure of self motion over time, and viewer characteristics are employed to determine the likelihood of motion sickness.

13. The method claimed in claim 1, wherein the digital image sequence is generated from a specification and the specification is adjusted to reduce the propensity to induce motion sickness.

14. A system for generating an immersive digital image sequence capable of providing a perception of self-motion, comprising:
  a) means for generating the digital image sequence; and
  b) means for adjusting the digital image sequence in response to a viewer selection to control the perception of self-motion, such that the degree of motion sickness induced in a viewer of the digital image sequence is controlled.

15. The system claimed in claim 14, wherein the means for adjusting the digital image sequence includes means selected from the group comprising: means for selectively controlling the sharpness of the entire image, selectively controlling the sharpness of the periphery of the image, means for selectively controlling the field of view of the image; means for selectively controlling the contrast of the image; means for selectively controlling whether or not the image sequence is stereo or monoscopic; means for selectively controlling the apparent velocity or acceleration of the viewer of the image; means for selectively controlling the apparent orientation of the viewer with respect to the viewer's frame of reference; means for selectively controlling the angular rotation of the viewer's frame of reference; means for selectively controlling the noise in the periphery of the image; means for selectively interposing a fixed reference with respect to the image; means for selecting a sequence from a plurality of sequences having different amounts of self motion; and means for selectively controlling the control display ratio of a viewer interface device.

16. The system claimed in claim 14, further comprising means for monitoring a viewers physical response to viewing the image sequence and producing a signal and wherein the means for adjusting is responsive to the signal.

17. The system claimed in claim 16, wherein the means for monitoring is selected from one or more monitoring means selected from the group comprising: galvanic skin response, skin temperature, rate of perspiration, skin color, heart rate variability, frequency of eye movements, breathing rate, depth of breathing, and gastrointestinal activity.

18. The system claimed in claim 14, wherein the viewer selection can be performed while viewing the image sequence.

19. The system claimed in claim 14, wherein the viewer selection can be performed prior to viewing the image sequence.

20. The system claimed claim 14, wherein the means for adjusting is adapted to be operated by a creator of the digital image sequence to create a predetermined perception of self motion.

21. The system claimed in claim 14, wherein the digital image sequence is a computer generated image sequence.

22. The system claimed in claim 14, wherein the digital image sequence is a photographic image sequence.

23. The system claimed in claim 22, wherein the means for adjusting further comprises:
- b1) means for employing camera position information and edge information in a digital image sequence to determine the likelihood of motion sickness from the image sequence, and
- b2) means for adjusting the digital image sequence as a function of the determined likelihood of motion sickness.

24. The system claimed in claim 23, wherein one or more characteristics selected from the group comprising: edge velocity and acceleration in the image sequence, display characteristics, a measure of self motion over time, and viewer characteristics are employed to determine the likelihood of motion sickness.

25. The system claimed in claim 15, wherein the digital image sequence is stored in a hierarchical compressed format, and the image sharpness is controlled by decompressing a limited number of hierarchies.

26. The system claimed in claim 15, wherein the digital image sequence is generated from a specification and the specification is adjusted to reduce the propensity to induce motion sickness.

27. A method of generating an immersive digital image sequence capable of providing a perception of self-motion, comprising the steps of:
- a) generating the digital image sequence; and
- b) adjusting the digital image sequence to control the perception of self-motion such that the degree of motion sickness induced in a viewer of the digital image sequence is controlled, wherein the adjusting is performed in response to monitoring a viewer's physical response to viewing the image sequence and, wherein the monitoring is selected from one or more of the group comprising: galvanic skin response, skin temperature, rate of perspiration, skin color, heart rate variability, frequency of eye movements, breathing rate, depth of breathing, and gastro-intestinal activity.

28. The method claimed claim 27, wherein the adjusting is performed by a creator of the digital image sequence to create a predetermined perception of self motion.

29. The method claimed in claim 27, wherein the digital image sequence is a computer-generated image sequence.

30. The method claimed in claim 27, wherein the digital image sequence is a photographic image sequence.

31. The method claimed in claim 30, wherein the adjusting step further comprises the steps of:
- b1) employing camera position information and edge information in a digital image sequence to determine the likelihood of motion sickness from the image sequence, and
- b2) adjusting the digital image sequence as a function of the determined likelihood of motion sickness.

32. The method claimed in claim 31, wherein one or more characteristics selected from the group comprising: edge velocity and acceleration in the image sequence, display characteristics, a measure of self motion over time, and viewer characteristics are employed to determine the likelihood of motion sickness.

33. The method claimed in claim 29, wherein the digital image sequence is adjusted by adjusting the images in the digital image sequence, with an adjustment selected from the group comprising: selectively controlling the sharpness of the entire image; selectively controlling the sharpness of the periphery of the image; selectively controlling the field of view of the image; selectively controlling the contrast of the displayed image; selectively controlling whether or not the image sequence is stereo or monoscopic; selectively controlling the apparent velocity or acceleration of the viewer of the image; selectively controlling the apparent orientation of the viewer with respect to the viewer's frame of reference; selectively controlling the angular rotation of the viewer's frame of reference; selectively controlling the noise in the periphery of the image; selectively interposing a fixed reference with respect to the image; selecting a sequence from a plurality of sequences having different amounts of self motion; and selectively controlling the control display ratio of a viewer interface device.

34. The method claimed in claim 33, wherein the digital image sequence is stored in a hierarchical compressed format, and the image sharpness is selectively controlled by decompressing a limited number of hierarchies.

35. The method claimed in claim 27, wherein the digital image sequence is generated from a specification and the specification is adjusted to reduce the propensity to induce motion sickness.

36. A method of generating an immersive digital image sequence capable of providing a perception of self-motion, comprising the steps of:
- a) generating the digital image sequence; and
- b) adjusting the digital image sequence to control the perception of self-motion such that the degree of motion sickness induced in a viewer of the digital image sequence is controlled, wherein the adjusting is performed by a creator of the digital image sequence to create a predetermined perception of self motion.

37. The method claimed in claim 36, wherein the digital image sequence is adjusted by adjusting the images in the digital image sequence, with an adjustment selected from the group comprising: selectively controlling the sharpness of the entire image; selectively controlling the sharpness of the periphery of the image; selectively controlling the field of view of the image; selectively controlling the contrast of the displayed image; selectively controlling whether or not the image sequence is stereo or monoscopic; selectively controlling the apparent velocity or acceleration of the viewer of the image; selectively controlling the apparent orientation of the viewer with respect to the viewer's frame of reference; selectively controlling the angular rotation of the viewer's frame of reference; selectively controlling the noise in the periphery of the image; selectively interposing a fixed reference with respect to the image; selecting a sequence from a plurality of sequences having different amounts of self motion; and selectively controlling the control display ratio of a viewer interface device.

38. A method of generating an immersive digital image sequence capable of providing a perception of self-motion, comprising the steps of:
- a) generating the digital image sequence; and
- b) adjusting the digital image sequence to control the perception of self-motion such that the degree of motion sickness induced in a viewer of the digital image sequence is controlled, wherein the digital image sequence is a photographic image sequence.

39. The method claimed in claim 38, wherein one or more characteristics selected from the group comprising: edge velocity and acceleration in the image sequence, display characteristics, a measure of self motion over time, and viewer characteristics are employed to determine the likelihood of motion sickness.

40. A method of generating an immersive digital image sequence capable of providing a perception of self-motion, comprising the steps of:

a) generating the digital image sequence; and b) adjusting the digital image sequence to control the perception of self-motion such that the degree of motion sickness induced in a viewer of the digital image sequence is controlled, wherein the digital image sequence is generated from a specification and the specification is adjusted to reduce the propensity to induce motion sickness.

41. A system for generating an immersive digital image sequence capable of providing a perception of self-motion, comprising:

a) means for generating the digital image sequence;

b) means for adjusting the digital image sequence to control the perception of self-motion, such that the degree of motion sickness induced in a viewer of the digital image sequence is controlled; and c) means for monitoring a viewer' physical response to viewing the image sequence and producing a signal, the means for adjusting being responsive to the signal and, wherein the means for monitoring is selected from one or more monitoring means selected from the group comprising: galvanic skin response, skin temperature, rate of perspiration, skin color, heart rate variability, frequency of eye movements, breathing rate, depth of breathing, and gastro-intestinal activity.

42. A system for generating an immersive digital image sequence capable of providing a perception of self-motion, comprising:

a) means for generating the digital image sequence; and b) means for adjusting the digital image sequence to control the perception of self-motion, such that the degree of motion sickness induced in a viewer of the digital image sequence is controlled, wherein the means for adjusting is adapted to be operated by a creator of the digital image sequence to create a predetermined perception of self motion.

43. A system for generating an immersive digital photographic image sequence capable of providing a perception of self-motion, comprising:

a) means for generating the digital image sequence; and b) means for adjusting the digital image sequence to control the perception of self-motion, such that the degree of motion sickness induced in a viewer of the digital image sequence is controlled, the means for adjusting including:

b1) means for employing camera position information and edge information in a digital image sequence to determine the likelihood of motion sickness from the image sequence, and b2) means for adjusting the digital image sequence as a function of the determined likelihood of motion sickness.

44. The system claimed in claim 43, wherein one or more characteristics selected from the group comprising: edge velocity and acceleration in the image sequence, display characteristics, a measure of self motion over time, and viewer characteristics are employed to determine the likelihood of motion sickness.

* * * * *